US007515664B1

(12) United States Patent
Yeoh

(10) Patent No.: US 7,515,664 B1
(45) Date of Patent: Apr. 7, 2009

(54) METHOD OF RECOVERING DATA IN ASYNCHRONOUS APPLICATIONS

(75) Inventor: Tze Yi Yeoh, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 733 days.

(21) Appl. No.: 11/111,183

(22) Filed: Apr. 21, 2005

(51) Int. Cl.
*H04L 7/00* (2006.01)

(52) U.S. Cl. .................. 375/354; 375/232; 375/371; 375/235; 375/376; 708/313; 327/141; 358/400; 358/405; 358/410; 358/415; 358/420; 358/425; 358/429; 370/503; 713/400

(58) Field of Classification Search .......... 375/354
See application file for complete search history.

(56) References Cited

U.S. PATENT DOCUMENTS

| 6,690,201 | B1 | 2/2004 | Simkins et al. | |
|---|---|---|---|---|
| 6,891,410 | B2 * | 5/2005 | Sadowski | 327/141 |
| 7,034,597 | B1 * | 4/2006 | Mo et al. | 327/276 |
| 7,106,115 | B2 * | 9/2006 | Carley et al. | 327/164 |

OTHER PUBLICATIONS

Baetoniu, et al., "High Speed Data Recovery Using Asynchronous Data Capture Techniques", XAPP671, Jan. 7, 2005, pp. 1-12, (v1.1), Available from Xilinx, Inc., 2100 Logic Drive, San Jose, CA.

Yeoh, Tze Yi; "Dynamic Phase Alignment for Networking Applications", XAPP700, Dec. 7, 2004, pp. 1-15, (v1.1), Available fron Xilinx, Inc., 2100 Logic Drive, San Jose, CA 95124.

Baetoniu, C., et al., "Dynamic Phase Alignment Using Asynchronous Data Capture", XAPP 697 (v1.2) Jan. 7, 2005, Available from Xilinx, Inc. 2100 Logic Drive, CA 95124.

* cited by examiner

*Primary Examiner*—Shuwang Liu
*Assistant Examiner*—Dhaval Patel
(74) *Attorney, Agent, or Firm*—Thomas A. Ward; Justin Liu

(57) ABSTRACT

Data is recovered in an asynchronous environment where a sampling clock is generated internally, and is not externally frequency locked, by using programmable delay modules each providing a number of delay tap outputs. To recover data, two of the delay modules are used with a first delay module designated as a monitor delay module to monitor the clock edge transitions, while a second delay module is designated as a data delay module that provides a data output. A controller provides for incrementing or decrementing the tap delay of both delay modules to assure clock data falls at the center of the monitoring window as determined using the monitor delay module. The controller further selects between the two delay modules as to which provides data and which is used as for clock edge monitoring when the clock edge transitions drifts to an edge of the monitoring window.

11 Claims, 9 Drawing Sheets

METHOD OF RECOVERING DATA IN ASYNCHRONOUS APPLICATIONS

BACKGROUND

1. Technical Field

The present invention relates to a configuration of an integrated circuit for recovering data that is asynchronous, where a clock is not sent with the data.

2. Related Art

In a synchronous environment, a clock is forwarded along with the data. The clock is frequency locked to the data. Resources of a number of types of integrated circuits (ICs), such as an FPGA, can be used to recover the data using the accompanying clock signal.

In asynchronous environments, however, no forwarding clock is provided. Data recovery circuitry in an IC may use a self-generated system clock to try and match the incoming data rate, but since the two rates are generated from two different clock sources, a nominal difference is created between the two rates. The incoming data will typically exhibit a certain amount of frequency wander (i.e. 200 ppm) from the system clock of the IC. Sampling the incoming data with the system clock with no intervening mechanisms will result in bit errors. Traditionally two methods used to recover data in an asynchronous environment as described below.

In a first data recovery method, multiple phases are generated from the system clock to over sample the incoming data. In FPGAs such as the Virtex-4 made by Xilinx, Inc. of San Jose, Calif., the Digital Clock Manager (DCM) is typically used to generate multiple phases of the system clock to over sample the data. Then, using a system of edge detection mechanisms, a state machine picks the correct sample to forward to the rest of the system. The disadvantage of this method is that every phase of the over sampling clock generated must be routed through a global clock buffer, severely limiting the number of global clock buffers available for general use. Furthermore, the use of multiple global clock buffers dramatically increases the power consumption of the system.

In a second recovery method, a phase locked loop (PLL) is used to synthesize a frequency matched clock from the incoming data. The disadvantage of this scheme is the necessity for additional components, namely the PLL and loop filters.

SUMMARY

According to embodiments of the present invention an IC, such as an FPGA, is used with input delay modules having multiple delay taps. The different delay taps enable a user to recover data in asynchronous environments where the sampling clock is internally generated and not externally frequency locked to the data.

The data recovery circuitry includes two delay modules with the tap delay lines. To maintain a clock, a system clock operating near the expected synchronization clock is generated internal to an IC, such as an FPGA, containing the delay modules and provided to clock inputs of the delay modules. Input data is then monitored in one of the delay modules for clock accuracy, while the second delay module provides a data output. A controller provides for incrementing or decrementing the tap delay output from both delay modules to both provide synchronized output data and to maintain a clock edge monitoring window to minimize clock drift. The controller further selects between the two delay modules as to which provides data and which serves as a monitoring device.

To recover the data using two delay modules with tap delays, a method begins with selecting a monitoring window to cover a number of the taps. The center tap is initially set as the tap location for both of the delay modules, and a first of the delay modules is designated as a clock monitor module, while a second of the delay modules is designated as a data module to provide synchronized output data. Clock drift is then monitored by varying the tap locations throughout the monitoring window in the monitor delay module, and comparing outputs received from the monitor delay module with the data delay module. Compensation for clock drift is provided by adjusting the center tap location for both the monitor delay module and the data delay module.

In more detail, the method of synchronizing data chooses the monitor window width to cover at least twice the amount of jitter of the clock used to synchronize the data. First tap location breakpoints are chosen on either side of the center tap location at a distance greater than one half of the width of the monitor window. Further, second breakpoints are chosen from the first taps a number of taps that coincides with half the width of the monitoring window. The delay modules are then designated as monitor and data delay modules and scanning of the monitor delay device through the tap locations of the monitor window begins. If an edge from the input data is detected from a tap, the monitor delay module output is compared with the data delay module output to determine if a match occurs, and if there is a mismatch the presence of an edge within the monitoring window is identified.

To compensate for the clock drift, once an edge mismatch is detected, the center tap point is shifted for the monitor delay device and the data delay device one tap in the direction away from the monitor delay device tap point where the mismatch is identified. Mismatch detection and shifting continues until the monitor window center tap reaches a first breakpoint. When the first breakpoint is reached, the monitor delay center tap point is moved to the opposing first breakpoint, two additional bits are read from the data delay monitor if the system clock is slower than the incoming data bit rate (no additional bits are read from the data delay monitor if the system clock is faster than the incoming bit rate), and the designation of the data delay device and the monitor delay device is swapped. The newly designated data delay device then has its center tap location moved to the second breakpoint, and data reception and monitoring continues until the center tap location again reaches a first breakpoint.

BRIEF DESCRIPTION OF THE DRAWINGS

Further details of the present invention are explained with the help of the attached drawings in which.

DETAILED DESCRIPTION

A data recovery system that operates in an asynchronous environment according to embodiments of the present invention can be implemented with components in a general IC, or in a specific type of IC such as an FPGA. Although other ICs can be used, for reference when describing the embodiments to follow, the components will be described as provided in an FPGA.

Figure 1:
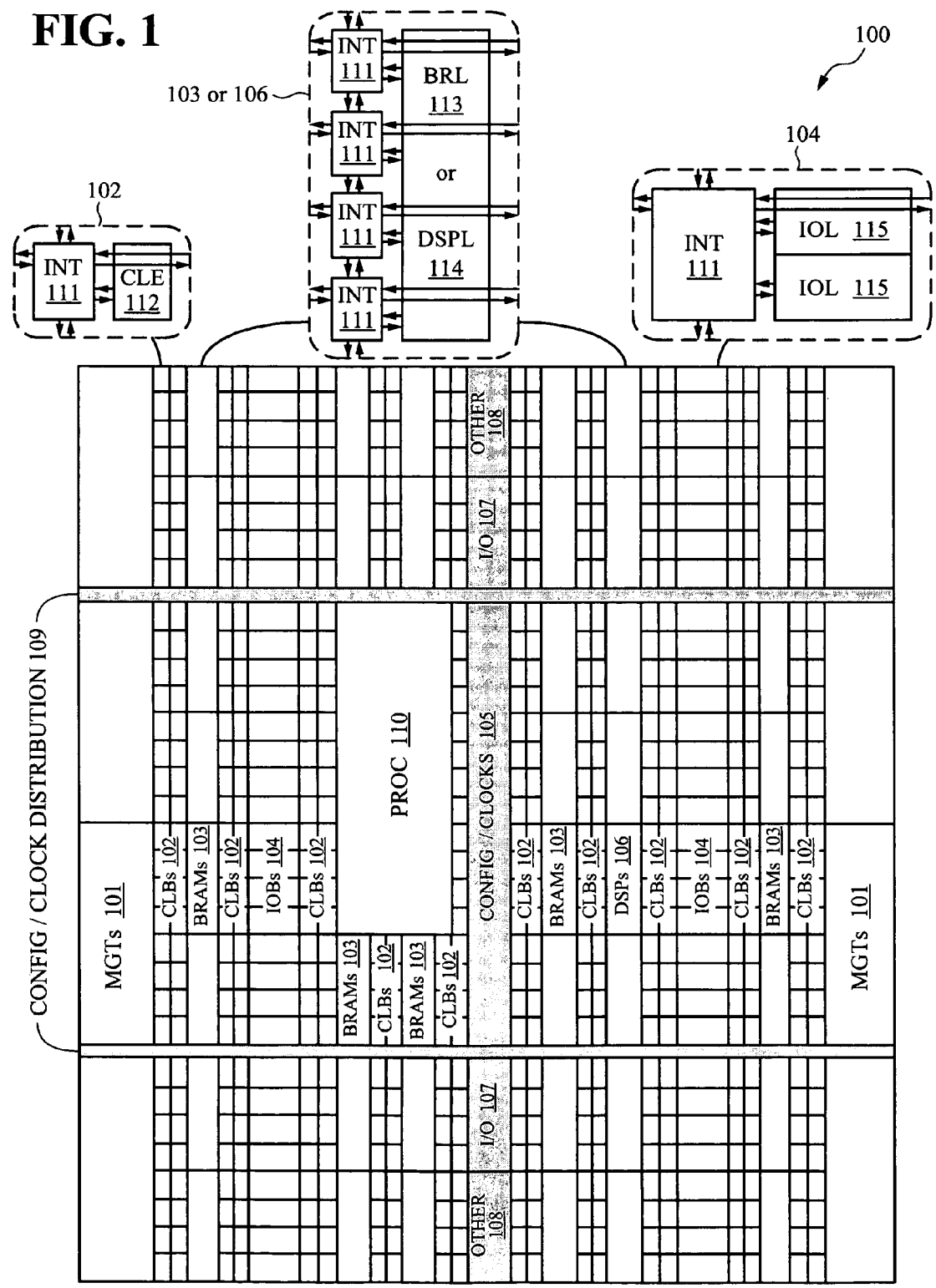
FIG. 1 illustrates components included in an FPGA.

FIG. 1, for reference, illustrates an overview of typical components included in an FPGA. The components include a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. The FPGA can also include a dedicated processor blocks (PROC 110).

Each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
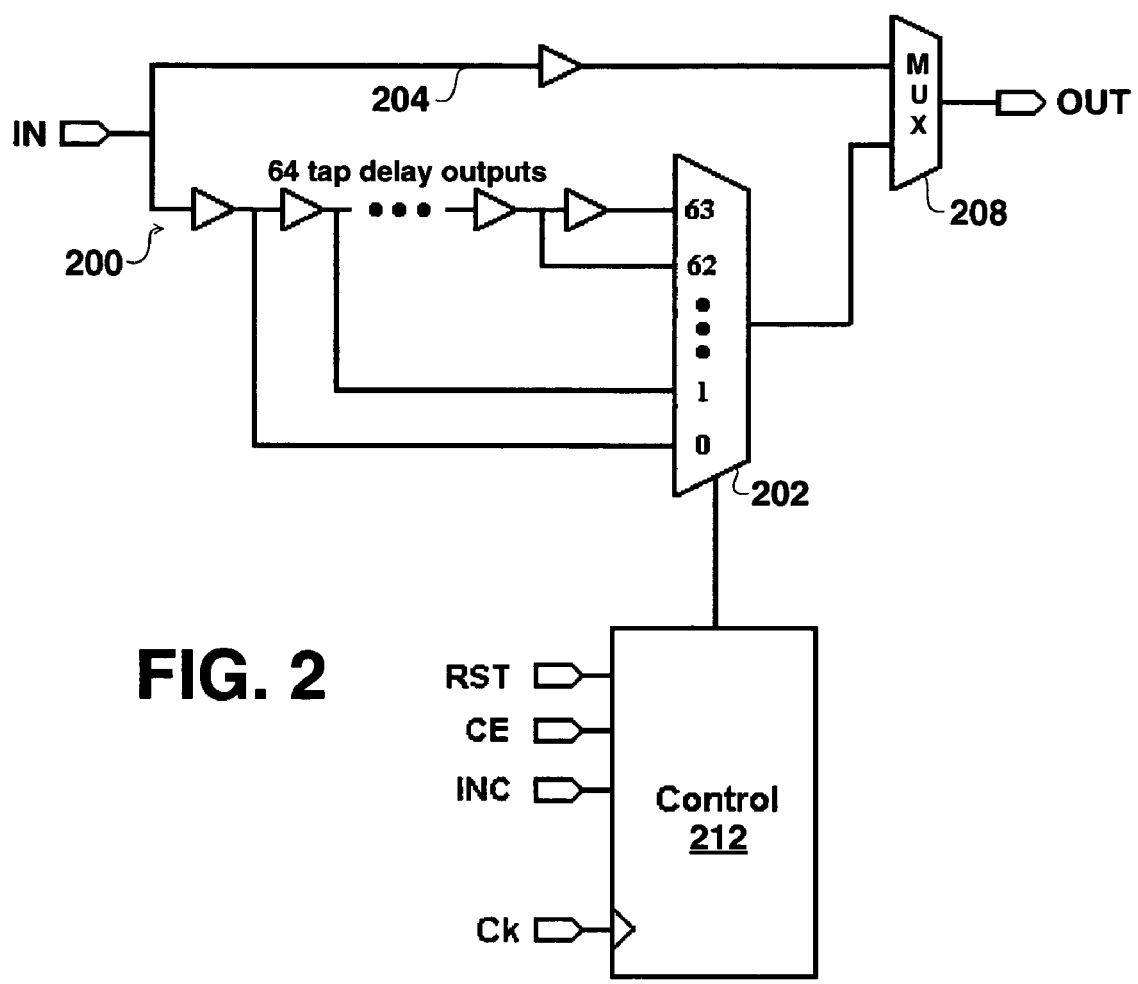
FIG. 2 shows a block diagram of components of a programmable delay module.

FIG. 2 shows a block diagram of components of a programmable delay module that can be used with embodiments of the present invention. Similar circuitry to that shown in FIG. 2 is included in the IOBs of the Virtex-4 family of FPGAs manufactured by Xilinx, Inc., of San Jose, Calif. Although the delay module of FIG. 2 is described herein, it is understood that alternative delay circuit configurations known in the art can be used to provide a variable delay in an IC for embodiments of the present invention.

The delay module of FIG. 2 includes a 64 tap delay line made up of buffers 200 having taps connecting the outputs of the buffers 200 to 64 inputs of a multiplexer 202. The series buffers 200 provide one path from the data input IN, while a second path 204 is provided through a single buffer when a programmable delay is not desired. The second path 204 and the output of multiplexer 202 are provided as inputs of another multiplexer 208. The output of the multiplexer 208 then provides the overall output OUT for the delay circuit of FIG. 2.

A control circuit 212 provides a select input to the multiplexer 202 to select a desired delay. In one embodiment, the delay provided by each buffer 200 is set to 78 picoseconds. The control inputs CE and INC, allow a user to increment and decrement the amount of delay inserted into the data path in the discrete steps of 78 ps. The control inputs RST and Ck, provide the reset and clock inputs to the control circuit 212.

When using low voltage differential signaling (LVDS), both common mode and differential mode inputs are required. To provide a programmed delay for each input, two IO blocks (IOBs) are used. With one delay module as shown in FIG. 2 available per IOB, programmable interconnects are made available to the user to make two delay modules available per LVDS input.

1. Data Recovery with Frequency Locked Clocks

Figure 3A:
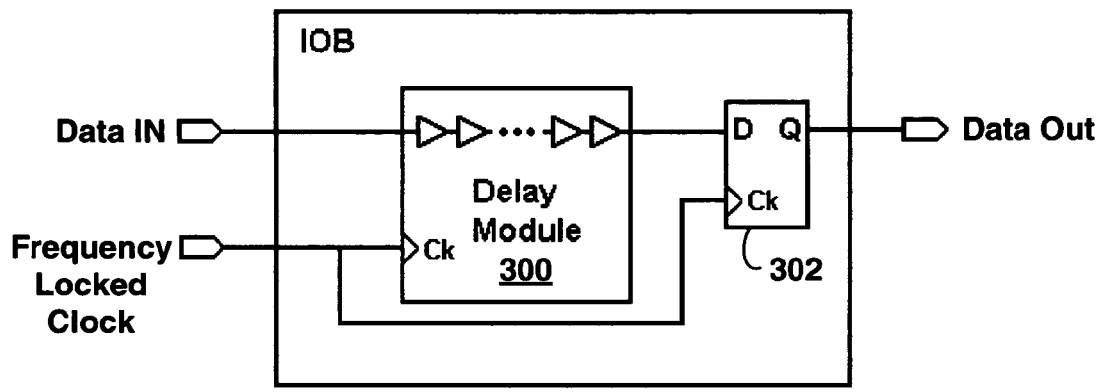
FIG. 3A shows a programmable delay module in a synchronous system for recovering data.
Figure 3B:
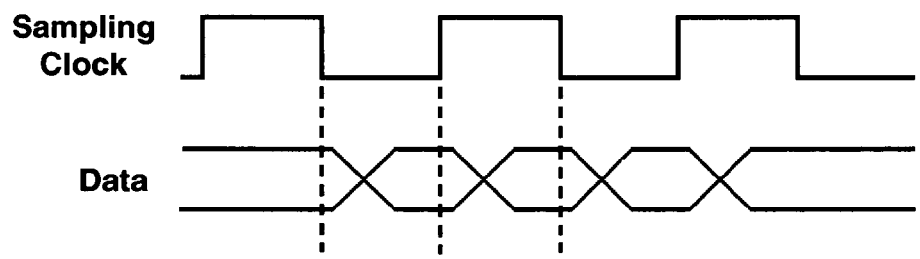
FIG. 3B is a timing diagram illustrating when received data is not synchronized with the circuit of FIG. 3A.
Figure 3C:
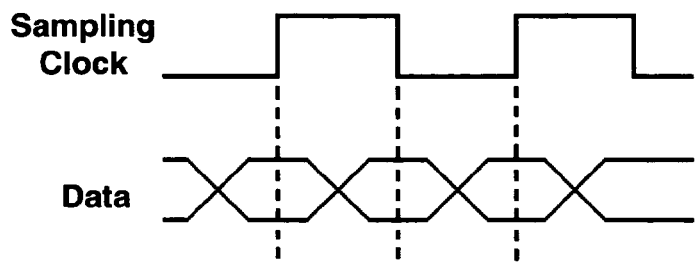
FIG. 3C is a timing diagram after synchronization using the circuit of FIG. 3A.

When sampling the incoming data in a synchronous system that sends both the data and clock, the delay module enables the user to obtain a static snapshot of the data. This circuit used for data recovery is illustrated in FIG. 3A showing connection of the delay module. FIGS. 3B-3C showing a timing diagram illustrating operation of the circuit of FIG. 3A to align the input data and clock signals.

As shown in FIG. 3A, the delay module 300 is connected to receive input data in its DATA IN input, while the frequency locked clock is provided to the clock (Ck) input. The clock signal is also provided to register 302 that receives the delayed output from the delay module 300. The output of register 302 then provides the synchronized input data to internal components of the FPGA.

The user can recover data by incrementing or decrementing the tap position to center the edge of a frequency locked clock signal at the center of the data valid region (also known as the 'data eye'). FIG. 3B illustrates the clock data that is received without any delay that is misaligned with the input data. The input data shown includes synchronization pulses used to align with the clock signal. The data is shown as a differential input, although a single signal input can likewise be provided. FIG. 3C illustrates how the data is delayed by being selectively incrementing or decrementing the tap position until the input data is centered with the clock edge. With 64 tap locations, typically more than one tap location will provide the synchronization desired, so a tap position is preferably chosen near the center of the taps. This gives the user maximum margin to either increment or decrement the tap position should the clock signal edge change during a later synchronization step to maintain the clock edge at the center of the data eye, as shown in FIG. 3C. More details of a synchronous system are provided in Xilinx Application Note XAPP 700 (v1.1) Dec. 7, 2004, entitled "Dynamic Phase Alignment For Networking Application," which is herein incorporated by reference.

2. Data Recovery with Non-Frequency Locked Clocks

In an asynchronous environment, no frequency locked clock is provided. The user can attempt to recover the incoming data by independently generating a clock that is of the same nominal frequency as the data rate. However, because this clock is independently generated, there will be a slight difference between the rate of the sampling clock and the data rate. This clock provided to a delay module, similar to FIG. 3A but non-synchronized, will either sample data at a slightly faster of slightly slower rate than the incoming data rate.

Figure 4A:
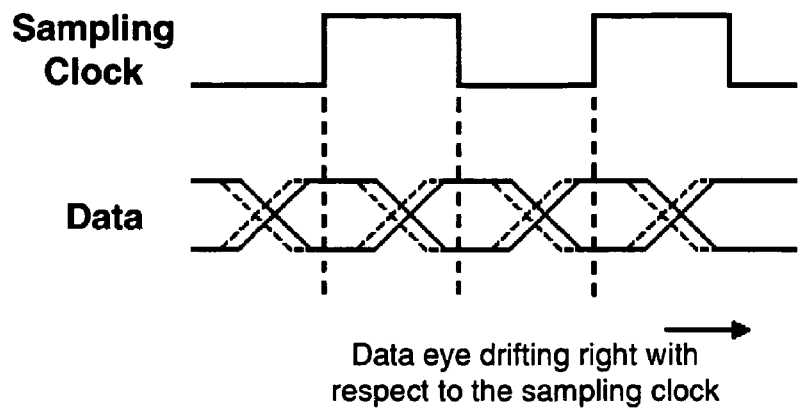
FIG. 4A is a timing diagram illustrating sampling clock edge drift to the right of the data eye over time with asynchronous clocking.
Figure 4B:
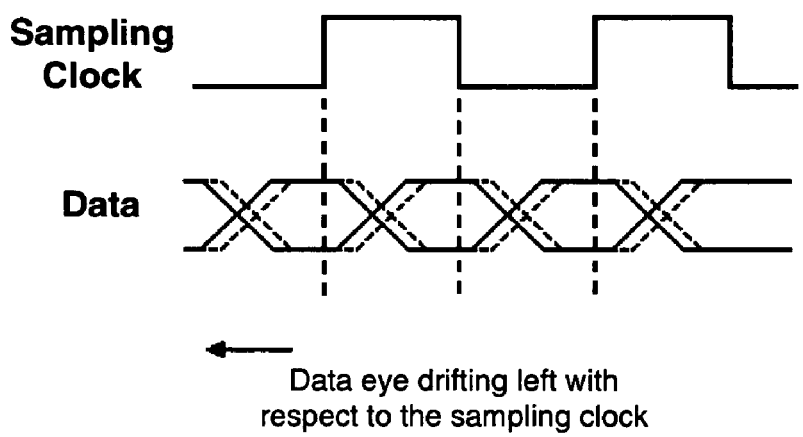
FIG. 4B is a timing diagram illustrating sampling clock edge drift to the left of the data eye over time with asynchronous clocking.

In the case that the sampling clock is slower than the incoming data rate, the sampling clock edge will drift to the right of the data eye over time as illustrated in FIG. 4A. Eventually if no corrective action is taken, the sampling clock edge will drift right out of the data eye into the next bit time. This will cause a bit error. Similarly in the case that the sampling clock is faster than the incoming data rate, the sampling clock edge will drift to the left of the data eye over time as illustrated in FIG. 4B. Again, if no corrective action is taken, the sampling clock edge will drift into the next bit time causing a bit error.

According to embodiments of the present invention, data recovery is provided for in an asynchronous environment to correct for the clock drift effect as described to follow.

A. Configuration of FPGA

Figure 5:
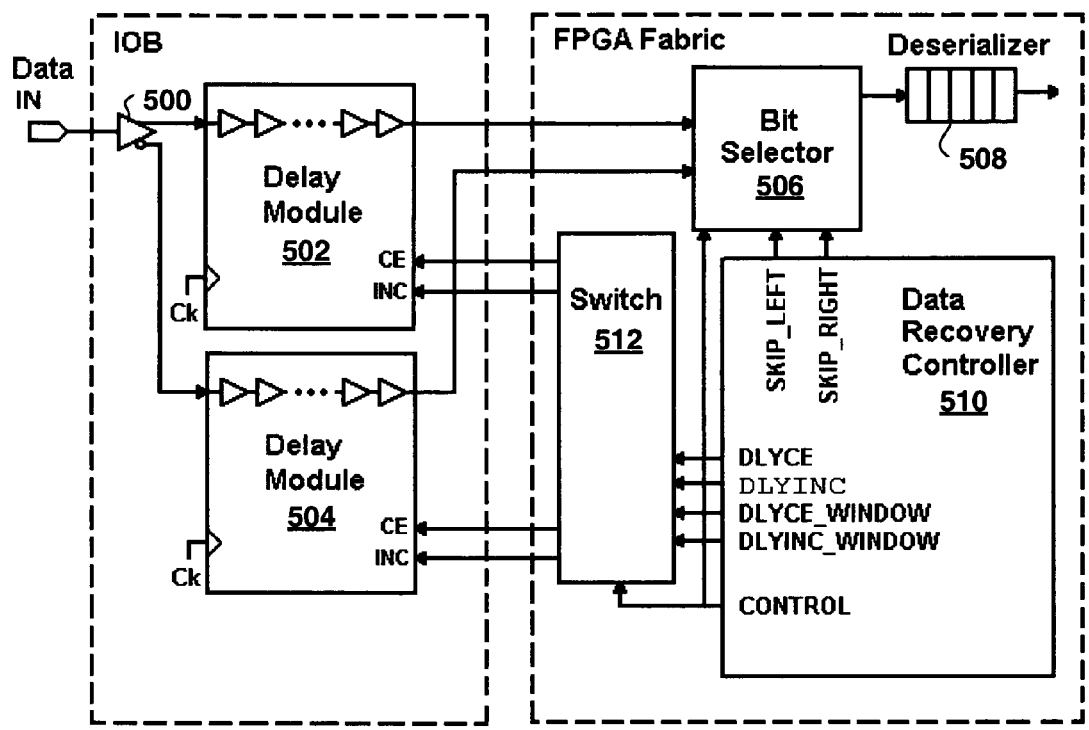
FIG. 5 illustrates a configuration of components of one embodiment of the present invention for recovering data.

FIG. 5 illustrates a configuration of components for recovering data of one embodiment of the present invention. The configuration is implemented with two delay modules 502 and 504. When using low voltage differential signaling (LVDS), programmable interconnects to link two IOBs are available in the Virtex-4 architecture and therefore the two delay modules 502 and 504 are readily available. The input data (Data In) is channeled into both delay modules 502 and 504 using a differential input and differential output buffer 500. The clock (ck) driving the delay modules 502 and 504 and the data recovery module (not shown in FIG. 5) is an internally generated clock that has the same nominal frequency as the data rate. The differential buffer 500 and delay modules 502 and 504 are contained in one embodiment in an IOB of the Virtex-4 FPGA.

The remaining data recovery components are provided within the FPGA fabric outside the IOB. The data outputs of the delay modules 502 and 504 are provided to a bit selector 506 that can include multiplexers for selecting an output as well as registers for pipelining the recovered data. The data from the bit selector 506 is provided to a deserializer 508, or pipeline for directing the recovered data to other internal components of the FPGA. A data recovery controller 510 provides select control signals to the multiplexers of the bit selector circuit 506, as well as a switch circuit 512. The switch circuit 512 has outputs driving the CE and INC inputs of the delay modules 502 and 504 to increment and decrement the tap output locations to selectively change the delay amount provided by each delay circuit 502 and 504. The inputs to the switch circuit 512 are provided from increment and decrement outputs (DLYCE and DLYINC) and increment and decrement tap window range outputs (DLYCE-WINDOW and DLYCINC-WINDOW) that have function described in operation of the circuit described subsequently.

Figure 6:
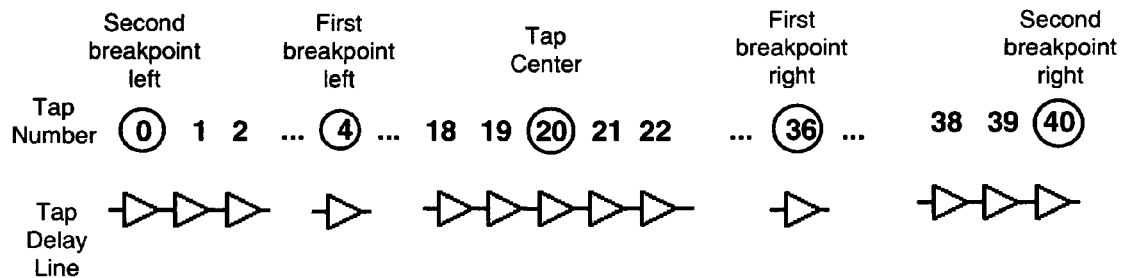
FIG. 6 shows an arrangement of the tap delay outputs from the delay modules of FIG. 5 to provide for data recovery.

FIG. 6 shows an arrangement of the tap delay outputs from the delay modules 502 and 504 to provide for data recovery. The length of the tap delay line to be used for the algorithm is chosen to be 40 taps long. Tap 20 is designated as the tap center. Taps 36 and 40 are designated first and second breakpoints right respectively, whereas Taps 4 and 0 are designated first and second breakpoints left respectively. The tap center and breakpoints are one example of a window used for data recovery. The size of a monitoring window is chosen such that it is twice the amount of cycle-to-cycle jitter. In this example, the monitoring window is chosen to be 8 taps or 624 ps wide (78 ps×8 taps=624 ps). Cycle jitter will be less than ½ of a clock cycle, so the window will be less than a clock cycle wide. The distance from the tap center to either first breakpoints will be set to greater than half of the monitoring window. This is to allow the algorithm to determine if the data eye is drifting towards a certain direction. A good rule of thumb is to set that distance equal to or greater than ¾ of the monitoring window. The distance between the first and second breakpoints on either side is then set to coincide with half the width of the monitoring window. The concept of a monitoring window is discussed in more detail to follow.

B. Data Recovery Method

Figure 7:
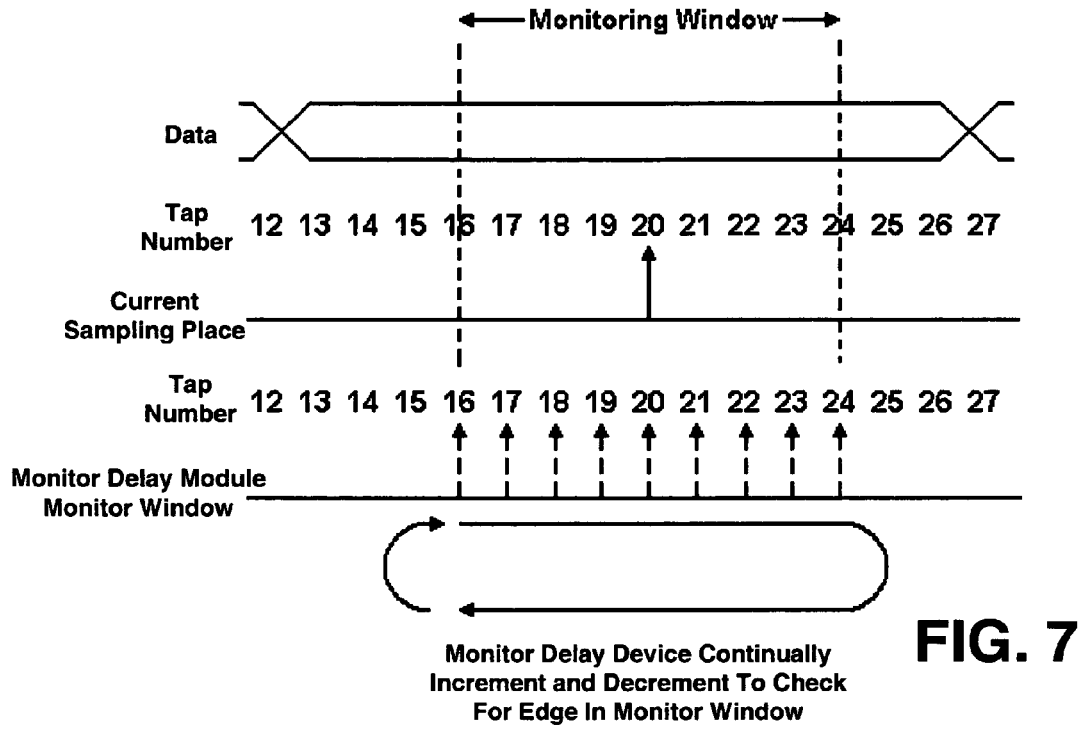
FIG. 7 provides timing diagrams illustrating initial setup of the monitor window and center tap for data extraction from a data delay module, and clock edge monitoring performed by a monitor delay module.

The process begins by designating one of the delay modules 502 and 504 as the data delay module and the other as the monitor delay module. Bits are sampled from the data delay module whereas, the monitor delay module is used to detect when the current sampling point is near the edge of the data eye. In this example when the process begins, the first delay module 502 (referred to initially as DELAY 1) is designated as the data delay module and the second delay module 504 (referred to initially as DELAY 2) is designated as the monitor delay module. In this scenario, the bit selector module 506 reads one bit from DELAY 1 into the deserializer 508 every clock cycle. Data is initially read from the center tap (current sampling point) of the data delay module. The monitor delay module is continuously scanning a monitor window by incrementing and decrementing tap locations within the monitor window to check for an edge in the data in the monitor window. FIG. 7 illustrates this scenario by showing the monitor window located between taps 16-24 and the center tap location initially set at tap 20 for data extraction, and the monitor delay module scanning through taps 16-24.

Figure 8:
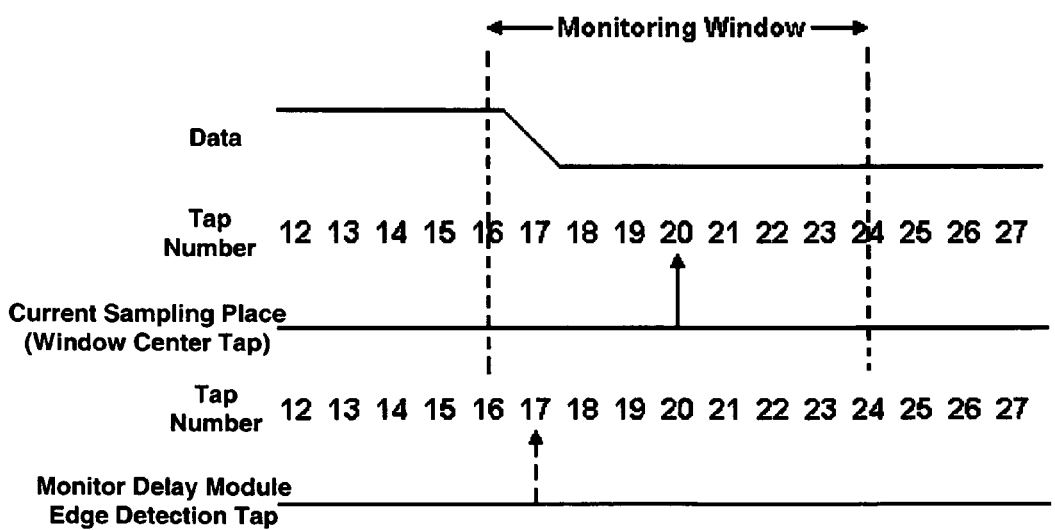
FIG. 8 provides timing diagrams illustration detection of a data edge occurring to the left of the monitor window center tap.
Figure 9:
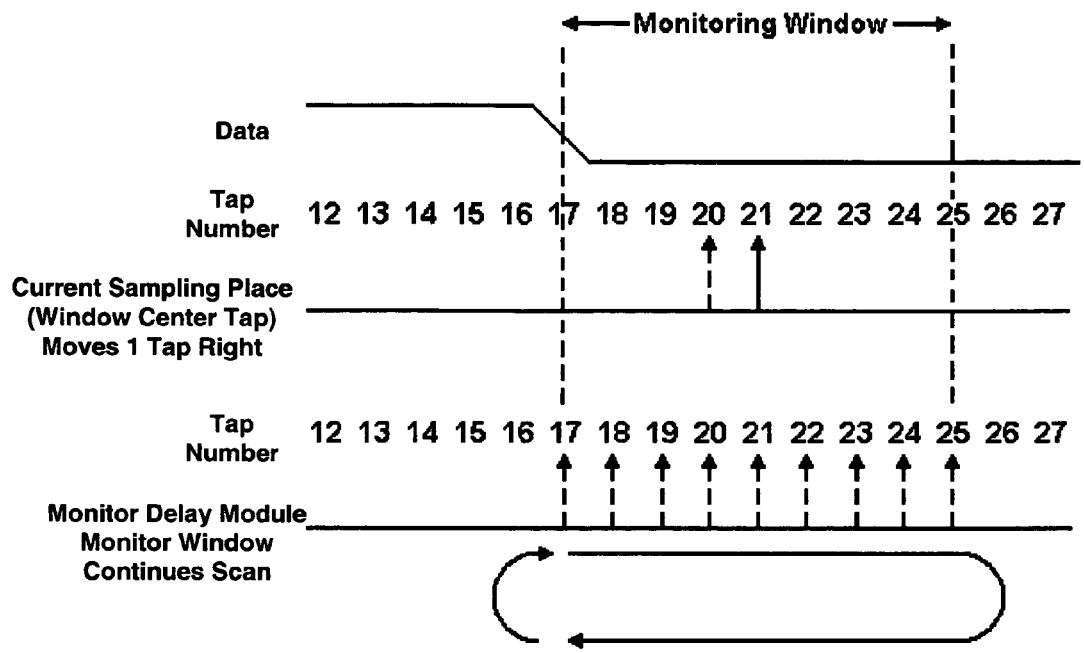
FIG. 9 provides timing diagrams illustrating movement of the center tap and monitor window one tap right in response to the scenario of FIG. 8.

In this example, both the data delay module and the monitor delay module are initialized to the middle of this tap delay line, which is TAP 20. The size of the monitoring window is chosen such that it is twice the amount of cycle-to-cycle jitter. In this example, the monitoring window is chosen to be 8 taps or 624 ps wide (78 ps×8 taps=624 ps). Every time the monitor delay module is incremented or decremented, its output is compared with the output of the data delay module to determine if the values match. If there is a mismatch, that signifies the presence of an edge within the monitoring window. FIG. 8 shows this by illustrating detection of an edge at tap 17 by the monitor delay module that is left of the center tap 20. With an edge detected on the left side of the data eye, the current center tap point for the monitor window is moved one tap to the right, e.g., tap 20 to 21, in both the data delay module and the monitor delay module, and scanning continues through the new monitor window taps, e.g., taps 17-25, as illustrated in FIG. 9.

Meanwhile, the monitor delay module continues to scan the new monitoring window looking for an edge. Assuming that the sampling clock is faster than the data rate, the data eye will slowly drift to the right with respect to the sampling clock edge. The monitor delay module will from time to time detect an edge on the left side of the sampling window and continuously bump the current sampling point one tap at a time towards the right. This happens until the current sampling point center reaches the first breakpoint on the right. Recall that this breakpoint is at a distance from the tap center that is greater than half of the monitoring window. This conclusively verifies that the data eye is indeed drifting to the right.

Figure 10:
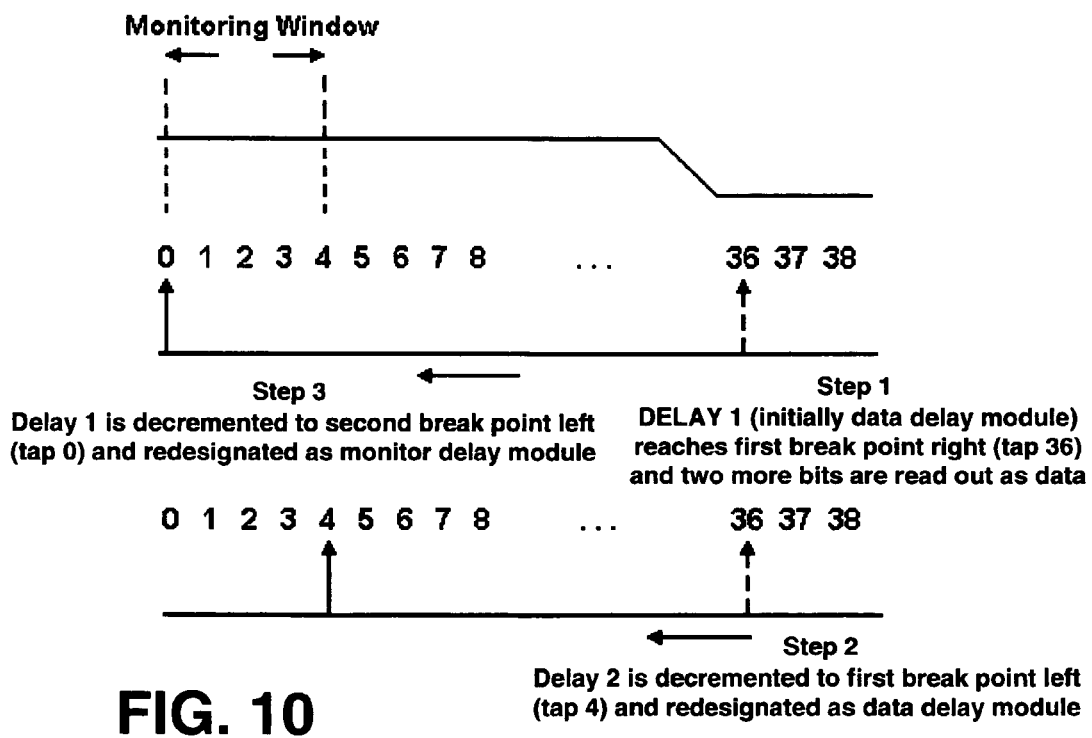
FIG. 10 provides timing diagrams illustrating the process when a first right breakpoint is reached.

Once the center tap of the data delay module reaches the first tap point, a decision is made to skip to the next bit time. The timing diagram of FIG. 10 illustrates this process. FIG. 10 starts by illustrating a step 1 where the data module, currently DELAY 1, reaches the first breakpoint right. Next, in a step 2, DELAY 2, up to this point designated as the monitor delay module, has its monitor center point decremented to the first breakpoint left. When this breakpoint is reached by DELAY 2, the designations are reversed. DELAY 2 is now designated as the data delay module and DELAY 1 is designated as the monitor delay module. Since the monitor delay module moved to a bit time ahead of the current bit time, two additional bits are read from the output of DELAY 1, the former data delay module, into the deserializer as part of step 1. From that moment, further data is read from the new data delay module, DELAY 2 into the deserializer, one bit per clock. Meanwhile in step 3, DELAY 1, the newly-designated monitor delay module, is decremented to the second breakpoint to begin its function as the monitor delay module.

Figure 11:
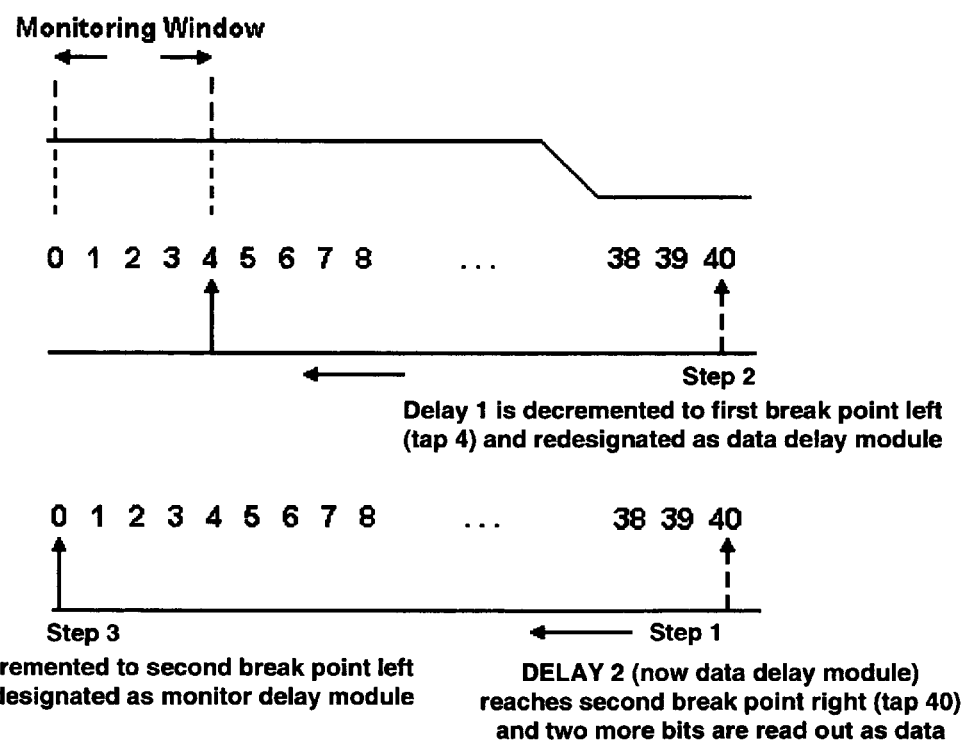
FIG. 11 provides timing diagrams illustrating the process when a second right breakpoint is reached.

Note that since the direction of the drift is now known (drifting toward the right), only the left half of the monitoring window needs to be monitored. As time goes on, data may continue drifting toward the right until the monitor delay module again detects an edge on the left. When this happens, as illustrated in FIG. 8, the process continues with the data delay module and the monitor delay module incrementing one tap to the right. The data delay module continuously bumps the tap delay one tap at a time to the right as the data eye drifts to the right until it arrives at the second breakpoint right where handoff now occurs as illustrated in FIG. 11. As shown in FIG. 11, once the second right breakpoint is reached, in a first step 1, DELAY 2 is redesigned as the monitor delay module and DELAY 1 is redesigned as the data delay module. Next, in a step 2, DELAY 1, up to this point designated as the monitor delay module, has its monitor center point decremented to the first left breakpoint (tap 4). Since the monitor delay module moved to a bit time ahead of the current bit time, two additional bits are read from the output of DELAY 2, the former data delay module, into the deserializer as part of step 1. From that moment, further data is read from the data delay module, now DELAY 1 into the deserializer, one bit per clock. Meanwhile in step 3, DELAY 2, the newly-designated monitor delay module, is decremented to the second breakpoint to begin its function as the monitor delay module. This process then continues as long as data continues to drift right.

The process is exactly mirrored if an edge is detected on the right side of the monitoring window. The data delay module, assumed initially to be DELAY 1, gradually decrements the tap delay to the left until the first breakpoint on the left is reached. Then, the monitor delay module (DELAY 2) increments until it reaches the previous bit time on first breakpoint right. At this point, it is designated as the data delay module and no bits are read into the deserializer (because the data delay module is sampling at a bit time that has already been read into the deserializer). The module DELAY 1 is incremented to a second breakpoint right and begins its newly-appointed duty of scanning the monitoring window. Since it is known that the data eye is drifting toward the left, only the right half of the monitoring window needs to be scanned. As time progresses and the data eye drifts to the left, DELAY 2 drifts along with the data eye until it again reaches the first breakpoint left. At this point, the hand-off occurs between DELAY 2 and DELAY 1 and the process continues.

Figure 12:
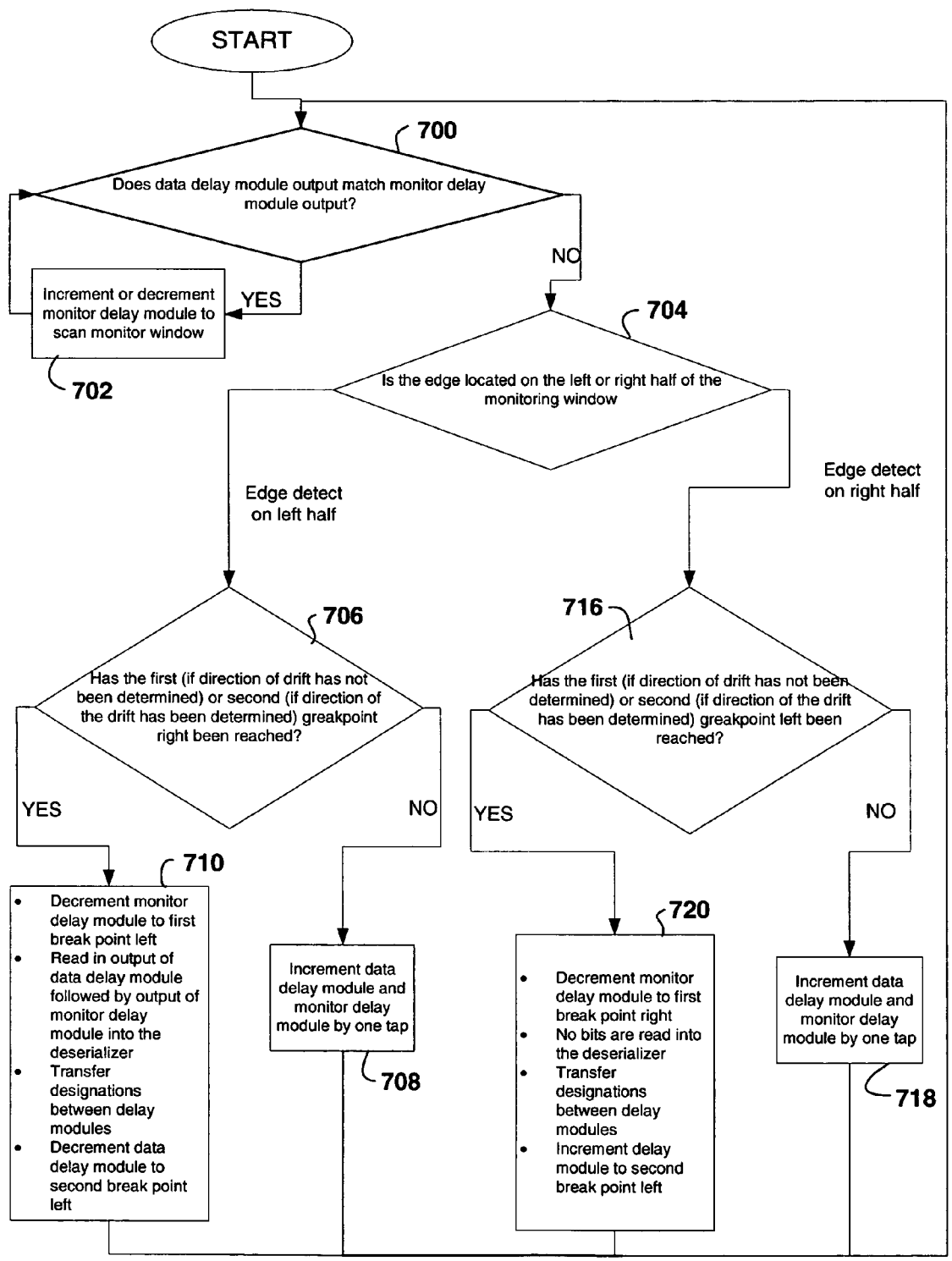
FIG. 12 provides a flow diagram summarizing steps for recovering asynchronous data.

FIG. 12 provides a flow diagram summarizing steps for recovering asynchronous data. After starting and setting the window size and breakpoints, once data recovery begins in step 700 it is determined if the data delay module output matches the monitor delay module output. If so, in step 702 data is determined to be aligned and the monitor delay module tap is continually scanned through tap locations. If a mismatch is detected in step 700, the process goes to step 704 where it is determined if a data edge is detected in the left or right half of the monitor window, and if a left edge is detected the process goes to step 706, and if a right is detected the process goes to step 716. For edges detected left, in step 706 it is determined if a first breakpoint is reached. If the breakpoint has not been reached, in step 708 the data and monitor delay modules are incremented and the flow proceeds back to step 700. If the first breakpoint has been reached, in step 710 the designation of data and monitor delay modules are reversed in a process as described previously with respect to FIG. 10 and the flow proceeds back to step 700. Should an edge be detected in step 704 to be on the right, steps 716, 718 and 720 proceed in a mirrored relation to steps 706, 708 and 710, with tap locations moved left rather than right before a breakpoint is reached and the data and monitor delay module designations are reversed once the breakpoint is reached before control is returned to step 700.

Although the present invention has been described above with particularity, this was merely to teach one of ordinary skill in the art how to make and use the invention. Many additional modifications will fall within the scope of the invention, as that scope is defined by the following claims.

What is claimed is:

1. A method of recovering data in an asynchronous environment using two programmable delay modules receiving input data, the delay modules having taps with outputs providing ascending delay values, the method comprising:

selecting a monitoring window size covering a number of the taps;

selecting one of the taps as a center tap of the monitoring window;

designating a first one of the delay modules as a data delay module for providing output data and initializing the data delay module to have an output provided from the center tap;

designating a second one of the delay modules as a monitor delay module;

determining clock drift by varying the tap outputs from the monitor delay module within the monitor window and comparing an output of the monitor delay module output with the data delay module output;

compensating for clock drift by adjusting the center tap location;

choosing first breakpoints located a number of the taps from the center tap of the monitoring window greater than one half of a size chosen for the monitoring window;

scanning a tap point of the monitor delay module through tap locations within the monitoring window and if an edge from the input data is detected from a given one of the taps, comparing the given tap output with the output from the data delay module to determine if a mismatch occurs, and if there is a mismatch identifying presence of an edge within the monitoring window;

shifting the center tap for the monitor delay module and the data delay module one tap in a direction away from the monitor delay device tap point when the mismatch is identified; and determining if the monitor window center tap reaches a first breakpoint after the shifting step and if not returning to the scanning step.

2. The method of claim 1, wherein the size of the monitoring window is chosen to be at least twice an amount of cycle-to-cycle jitter of a system clock input to the delay modules.

3. The method of claim 1, wherein if the determination step indicates the monitor delay module window center tap reached the first breakpoint, the first breakpoint being right of the center tap, the method further comprising:

moving the monitor delay center tap point to a left first break point;

reading additional bits from the data delay module;

changing the designation of the data delay module and monitor delay module between the first and second delay modules; and moving the data delay module center tap designation to a left second break point, wherein the left second breakpoint is located a number of the taps that coincides with half the size of the monitoring window away from the left first break point, and returning to the scanning step.

4. The method of claim 3, wherein if the determination step indicates the monitor delay module window center tap reaches a right second breakpoint, the method further comprising:

moving the monitor delay center tap point to the left first break point;

reading additional bits from the data delay module;

changing the designation of the data delay module and monitor delay module between the first and second delay modules; and moving the data delay module center tap designation to the left second break point, and returning to the scanning step.

5. The method of claim 1, wherein if the determination step indicates the monitor delay module window center tap reached the first breakpoint, the first breakpoint being left of the center tap, the method further comprising:

moving the monitor delay center tap point to a right first break point;

changing the designation of the data delay module and monitor delay module between the first and second delay modules; and moving the data delay module center tap designation to a right second break point, wherein the right second breakpoint is located a number of the taps that coincides with half the size of the monitoring window away from the right first break point, and returning to the scanning step.

6. The method of claim 5, wherein if the determination step indicates the monitor delay module window center tap reaches a left second breakpoint, the method further comprising:

moving the monitor delay center tap point to the right first break points;

changing the designation of the data delay module and monitor delay module between the first and second delay modules; and moving the data delay module center tap designation to a right second break point, and returning to the scanning step.

7. The method of claim 1, further comprising adjusting the output from the data delay module using a phase locked loop.

8. The method of claim 1, wherein the delay modules are provided in an FPGA.

9. A method of recovering input data in asynchronous environment where a synchronized clock is not provided with the data comprising:

establishing a monitoring window between taps provided in variable delay modules by:

choosing one of the taps as a center tap location for the monitoring window;

choosing a size of the monitoring window to be at least twice an amount of cycle-to-cycle jitter of a system clock provided to the delay modules;

choosing right and left first breakpoints, each located a number of the taps from the center tap location of the monitoring window greater than one half of the size of the monitoring window;

choosing right and left second breakpoints, each located from either of the first breakpoints a number of the taps that coincides with half the size of the monitoring window;

designating a first one of the delay modules as a data delay module for providing a data output and initializing the data delay module to have an output provided from the center tap;

designating a second one of the delay devices as a monitor delay module and initializing the monitor delay module to have an output provided from the center tap;

scanning a tap output from the monitor delay module through the taps within the monitoring window and if an edge from the input data is detected from the output of the monitor delay module, comparing the monitor delay module output with the output of the data delay module to determine if a mismatch occurs, and if the mismatch is detected, identifying presence of an edge within the monitoring window; and shifting the center tap location for the monitor delay module and the data delay module to one of the taps in a direction away from the tap of the monitor delay device where the mismatch was identified.

10. The method of claim 9, further comprising:

determining if the monitor window center tap reaches the right second breakpoint and if not returning to the scanning step;

moving the monitor delay center tap location to the left first breakpoint;

reading additional bits from the data delay module;

changing the designation of the data delay module and monitor delay module between the first and second delay modules; and moving the data delay module center tap designation to the left second break point, and returning to the scanning step.

11. The method of claim 9, further comprising:

determining if the monitor window center rap reaches the left second breakpoint and if not returning to the scanning step;

moving the monitor delay center tap point to the right first breakpoint;

changing the designation of the data delay module and monitor delay module between the first and second delay modules; and moving the data delay module center tap designation to the right second break point, and returning to the scanning step.

* * * * *